United States Patent
Singh

(10) Patent No.: US 10,528,328 B2
(45) Date of Patent: Jan. 7, 2020

(54) LEARNING FROM INPUT PATTERNS IN PROGRAMING-BY-EXAMPLE

(71) Applicant: Microsoft Technology Licensing, LLC, Redmond, WA (US)

(72) Inventor: Rishabh Singh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 14/962,964

(22) Filed: Dec. 8, 2015

(65) Prior Publication Data

US 2017/0161027 A1    Jun. 8, 2017

(51) Int. Cl.
*G06F 8/30* (2018.01)
*G06N 5/04* (2006.01)
*G06N 20/00* (2019.01)
*G06F 16/901* (2019.01)
*G06F 16/2457* (2019.01)

(52) U.S. Cl.
CPC .......... *G06F 8/30* (2013.01); *G06F 16/24578* (2019.01); *G06F 16/9024* (2019.01); *G06N 5/047* (2013.01); *G06N 20/00* (2019.01)

(58) Field of Classification Search
CPC .. G06F 8/30; G06F 16/24578; G06F 16/9024; G06F 8/20; G06F 8/36; G06F 17/2282; G06N 20/00; G06N 5/047
USPC .......................................................... 717/109
See application file for complete search history.

(56) References Cited

U.S. PATENT DOCUMENTS

| | | | |
|---|---|---|---|
| 5,388,198 A | 2/1995 | Layman et al. | |
| 8,108,828 B2 | 1/2012 | Pintar et al. | |
| 8,615,378 B2 | 12/2013 | Chen | |
| 8,799,234 B2 | 8/2014 | Gulwani et al. | |
| 8,825,695 B2 | 9/2014 | Studer et al. | |
| 8,972,930 B2 | 3/2015 | Gulwani | |

(Continued)

FOREIGN PATENT DOCUMENTS

| | | | |
|---|---|---|---|
| EP | 0401975 A2 | 12/1990 | |
| EP | 0582536 A1 | 2/1994 | |

OTHER PUBLICATIONS

Menon, et al., "A Machine Learning Framework for Programming by Example", In Proceedings of the 30th International Conference on Machine Learning, vol. 28, Jun. 16, 2013, 9 pages.

(Continued)

*Primary Examiner* — Emerson C Puente
*Assistant Examiner* — Sen Thong Chen
(74) *Attorney, Agent, or Firm* — Workman Nydegger

(57) ABSTRACT

Embodiments disclosed herein are related to systems and methods for using input logical patterns to generate one or more programs by an underlying Program-By-Example (PBE) system based on user input examples. A system includes a processor and a system memory. The system access a set of input data. The system receives one or more user input examples for the set of input data. The user input examples are indicative of an output that should be achieved to comply with a user determined result. The system analyzes the set of input data to identify one or more logical patterns that are common to the set of input data. The system generates one or more programs which will output the user determined result, based on a set of the one or more logical patterns that are consistent with the one or more user input examples.

16 Claims, 11 Drawing Sheets

(56) References Cited

U.S. PATENT DOCUMENTS

| | | | |
|---|---|---|---|
| 2006/0098671 A1* | 5/2006 | Shachnai | H04Q 11/0062 370/404 |
| 2007/0005539 A1 | 1/2007 | Bergman et al. | |
| 2010/0037127 A1* | 2/2010 | Tomasic | G06Q 10/06 715/224 |
| 2011/0016111 A1* | 1/2011 | Xie | G06F 16/3346 707/723 |
| 2012/0011152 A1 | 1/2012 | Gulwani et al. | |
| 2012/0110459 A1 | 5/2012 | Drory et al. | |
| 2012/0209886 A1* | 8/2012 | Henderson | G06F 17/30557 707/798 |
| 2013/0262417 A1 | 10/2013 | Zhou et al. | |
| 2013/0322765 A1* | 12/2013 | Neumann | G06K 9/00765 382/197 |
| 2013/0326475 A1 | 12/2013 | Gulwani et al. | |
| 2013/0346982 A1 | 12/2013 | Kalai et al. | |
| 2014/0108305 A1 | 4/2014 | Gulwani et al. | |
| 2014/0156633 A1* | 6/2014 | Duan | G06F 17/30442 707/713 |
| 2014/0188899 A1* | 7/2014 | Whitnah | G06Q 10/10 707/749 |
| 2014/0258206 A1 | 9/2014 | Harik | |
| 2016/0092779 A1* | 3/2016 | Werth | G06F 12/00 706/48 |
| 2016/0269554 A1* | 9/2016 | Cecchi | H04M 3/4936 |

OTHER PUBLICATIONS

Manshadi, et al., "Integrating Programming by Example and Natural Language Programming", In Proceedings of the Twenty-Seventh AAAI Conference on Artificial Intelligence, Jul. 14, 2013, 7 pages.
International Search Report and the Written Opinion issued in PCT application No. PCT/US2016/062987 dated Mar. 9, 2017.
Oleksandr Polozov et al: "FlashMeta: a framework for inductive program synthesis", Object-Oriented Programming, Systems, Languages, and Applications, ACM, 2 Penn Plaza, Suite 701, New York, New York 10121 published Oct. 23, 2015.
Singh Rishabh et al: "Predicting a Correct Program in Programming by Example", published Jul. 16, 2015, Network and Parallel Computing; [Lecture Notes in Computer Science; Lect. Notes Computer], Springer Internatioanl Publishing, Cham, XP047314833.
Sumit Gulwani: "Automating string processing in spreadhseets using input-output examples", Proceedings of the 2009 ACM Sigplan Conference on Programming Language Design and Implementation, PLDI '09, vol. 46, No. 1, Jan. 26, 2011.
Sumit Gulwani et al: "Spreadsheet data manipulation using examples", Communication of the ACM, vol. 55, No. 8, Aug. 1, 2012.

* cited by examiner

|   | Input $v_1$ | Output |
|---|---|---|
| 1 | Mumbai, India | India |
| 2 | Los Angeles, United States of America | |
| 3 | Newark, United States | |
| 4 | New York, United States of America | |
| 5 | Wellington, New Zealand | |
| 6 | New Delhi, India | |

*Figure 7A*

| Node | In | Out | Score |
|---|---|---|---|
| (9,14,9,11,13,12) | 68 | 88 | 156 |
| (9,31,16,28,17,12) | 6 | 43 | 49 |
| (9,5,9,5,13,5) | 6 | 30 | 36 |
| (9,31,9,28,13,12) | 0 | 54 | 54 |
| (14,38,22,35,22,17) | 150 | 6 | 156 |
| (14,27,22,24,24,17) | 128 | 0 | 128 |
| (14,12,15,9,16,10) | 36 | 0 | 36 |
| (14,38,19,35,22,17) | 6 | 0 | 6 |

LEARNING FROM INPUT PATTERNS IN PROGRAMING-BY-EXAMPLE

BACKGROUND

Today billions of users have access to computational devices. However, a large number of these users have no programming expertise and thus may be unable to author small scripts that would automate repetitive tasks in many programs. Programming-By-Example (PBE) has the potential to help such users generate the small scripts. PBE involves techniques that generate the small scripts based on examples input by the users that specify a result the user intends. PBE can be used for many domain-specific languages.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems and methods for using input logical patterns to generate one or more programs by an underlying Program-By-Example (PBE) system based on user input examples. In one embodiment, a system includes a processor and a system memory. The system access a set of input data. The system receives one or more user input examples for the set of input data. The user input examples are indicative of an output that should be achieved to comply with a user determined result. The system analyzes the set of input data to identify one or more logical patterns that are common to the set of input data. The system generates one or more programs which will output the user determined result, based on a set of the one or more logical patterns that are consistent with the one or more user input examples.

In another embodiment, user input data is received at a processor of a PBE computing system. The user input data includes at least a first input data string and a second input data string. One or more user input examples for the user input data are received. The user input examples are indicative of an output that should be achieved to comply with a user determined result. A first set of logical patterns for the first input data string is determined and a second set of logical patterns for the second input data string is determined. The first set of logical patterns for the first input data string are organized into a first graph having first nodes and first edges that connect the first nodes of the first graph. The second set of logical patterns for the second input data string are organized into a second graph having second nodes and second edges that connect the second nodes of the second graph. The first graph and the second graph are intersected to generate an intersected third graph having third nodes and third edges that connect the third nodes of the third graph. The third nodes and third edges are ranked based on the one or more user input examples. Based on the ranking, one or more programs which will output the user determined result are generated.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 7A-7D illustrate an example of generating a program using logical patterns based on the embodiments disclosed herein;

FIG. 8 illustrates a flow chart of an example method for generating a program based on common logical patterns of input data, the program outputting a user intended result based on a user input example.

DETAILED DESCRIPTION

Figure 1:
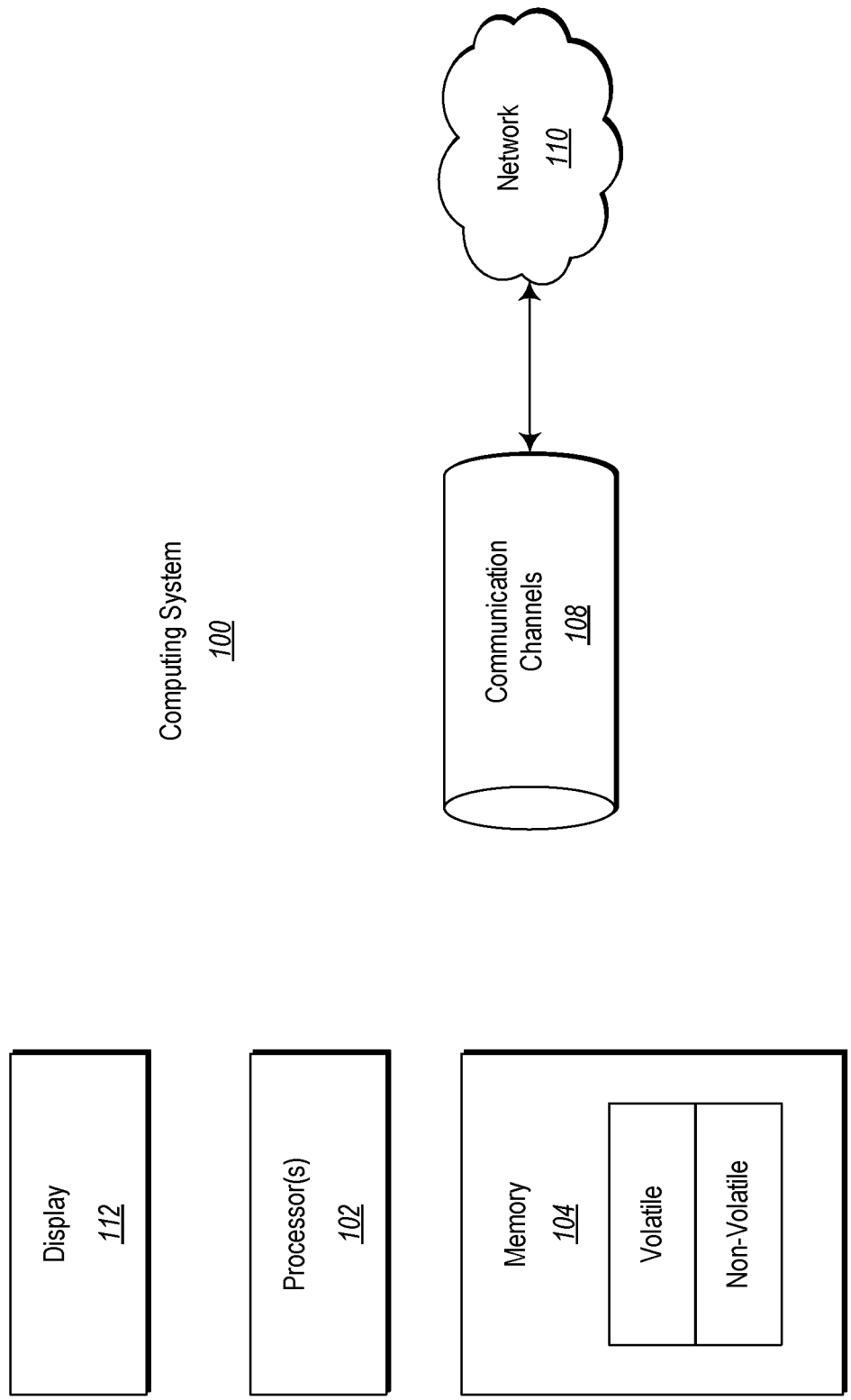
FIG. 1 illustrates a computing system in which some embodiments described herein may be employed.

Programming-By-Example (PBE) involves techniques that generate small programs and their associated sub-expressions based on examples input by users that specify a result the user intends. As will be appreciated, the number of small programs generated by PBE may be very large. Accordingly, the underlying PBE system may end up generating programs that are consistent with the examples input by the users, but that do not actually provide the result that was intended by the users. This is because there can be programs that are consistent with the provided examples, but that differ in behavior on some other inputs.

To solve this problem, PBE computing systems often will rank the generated programs to determine which one is the best for the result the user intended and provide that program to the user. However, this ranking often involves complex algorithms that require a large amount of computing resources to perform, which can slow the process for the users.

Aspects of the disclosed embodiments relate to the creation and use of PBE computing systems that can be used to provide more efficient ways to generate programs based on the user examples. In the present disclosure, the PBE computing system uses logical patterns that are common to the input data that is to be subjected to the generated program that produces the user intended result specified by the user input examples.

There are various technical effects and benefits that can be achieved by implementing aspects of the disclosed embodiments. By way of example, the use of the logical patterns in the disclosed embodiments significantly reduces the number of potential programs that may be generated by the PBE computing system, thus reducing the computer resources needed to generate the programs. In addition, the technical effects related to the disclosed embodiments can also include improved user convenience and efficiency gains through a reduction in the time it takes to use the PBE computing system, which may result in wider use of the PBE computing system.

Some introductory discussion of a computing system will be described with respect to FIG. 1. Then, the performance of a PBE computing system for using input logical patterns to generate one or more programs based on user input examples will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

Figure 9:
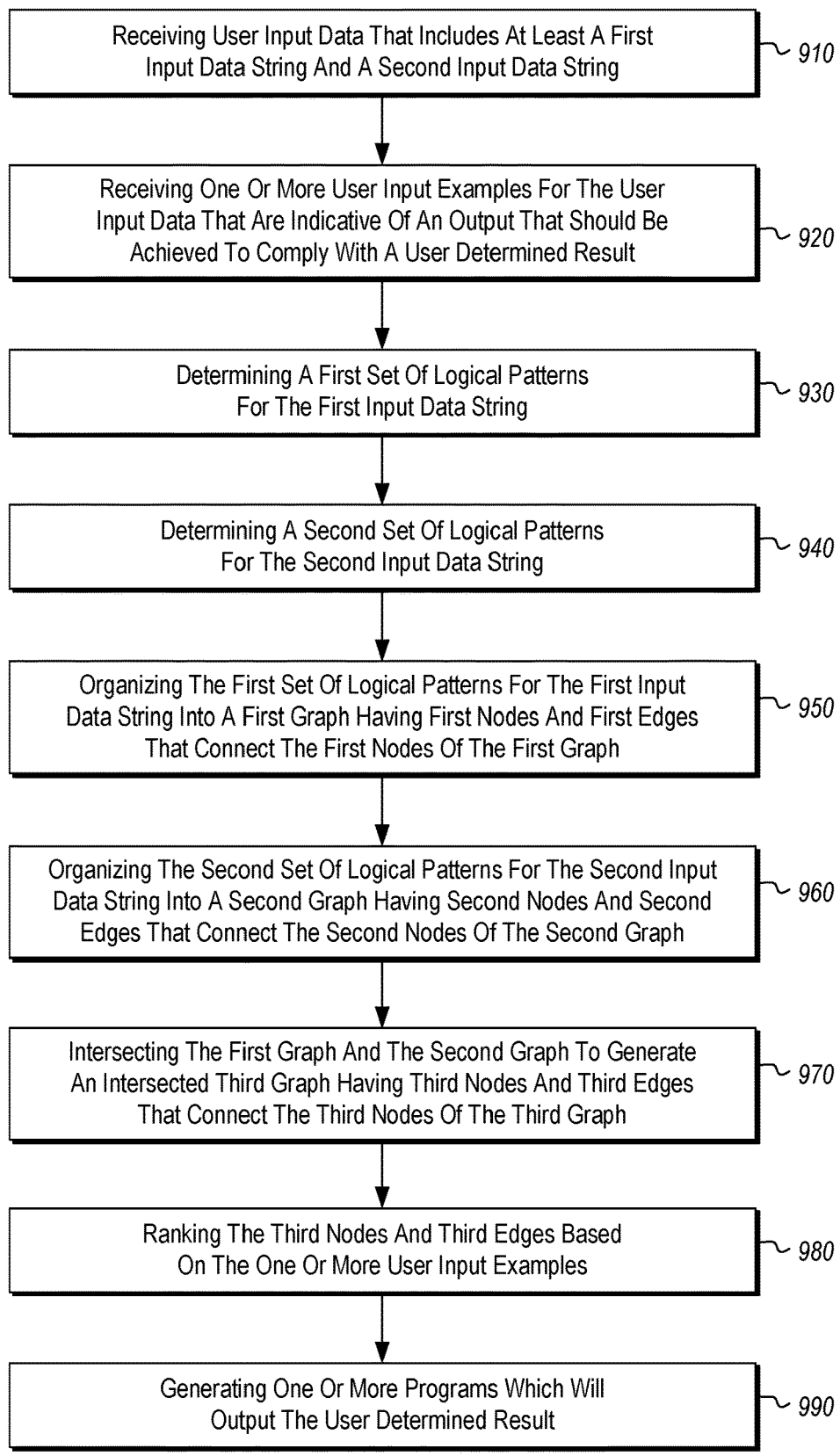
FIG. 9 illustrates a flow chart of an alternative example method for generating a program based on common logical patterns of input data, the program outputting a user intended result based on a user input example.

The computer-executable instructions may be used to implement and/or instantiate all of the disclosed functionality, particularly as disclosed in reference to the methods illustrated in the flow diagrams of FIGS. 9-11. The computer-executable instructions are also to implement and/or instantiate all of the interfaces disclosed herein, including the analysis view windows and graphics.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Figure 2:
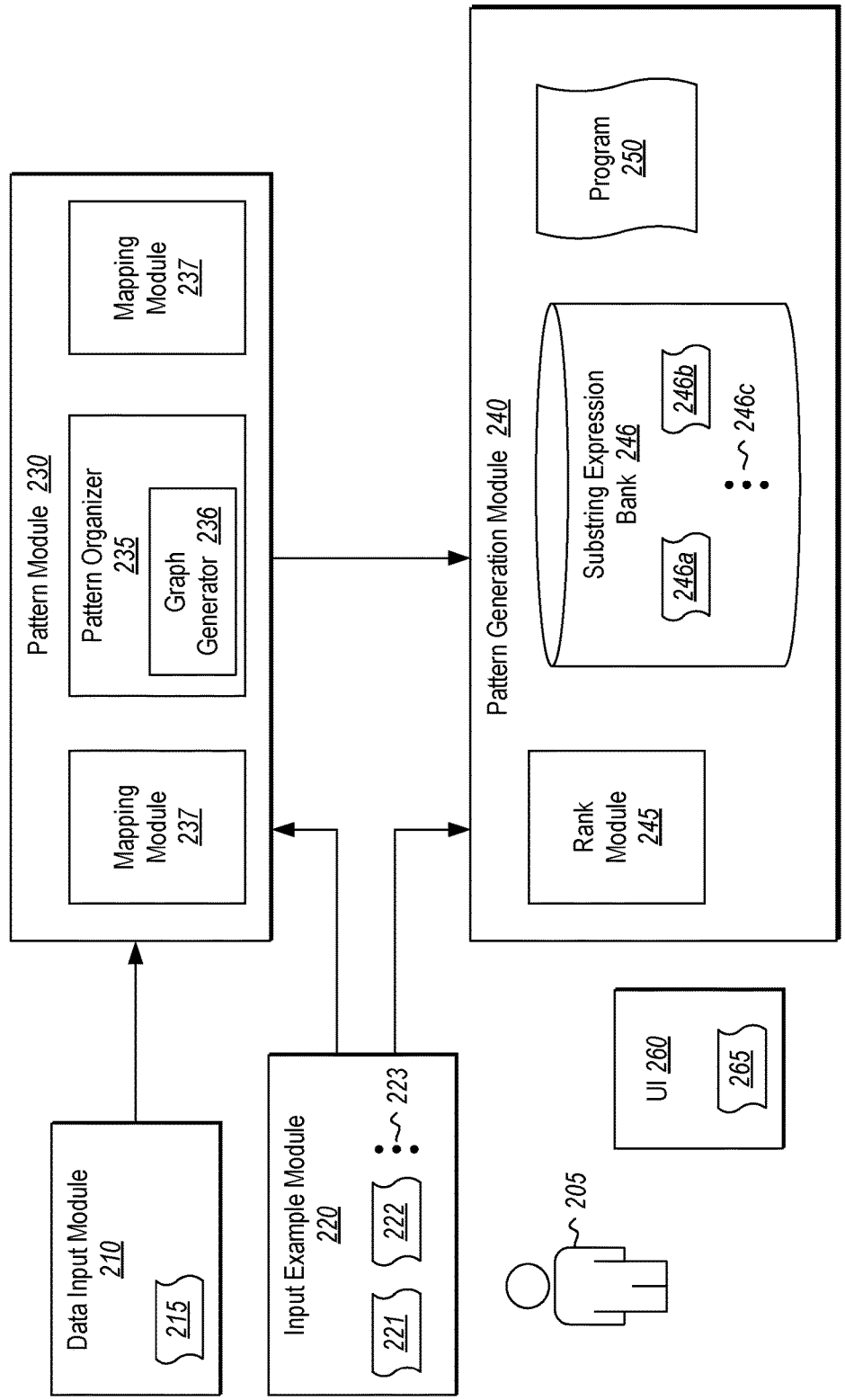
FIG. 2 illustrates an embodiment of a Programming-by-Example (PBE) computing system.

Attention is now given to FIG. 2, which illustrates an embodiment of a Programming-By-Example (PBE) computing system 200, which may correspond to the computing system 100 previously described. The PBE computing system 200 includes various modules or functional blocks that may be used to generate one or more programs based on logical patterns of input data as will be explained. The various modules or functional blocks of PBE computing system 200 may be implemented on a local computing system or may be implemented on a distributed computing system that includes elements resident in the cloud or that implement aspects of cloud computing. The various modules or functional blocks of PBE computing system 200 may be implemented as software, hardware, or a combination of software and hardware. The PBE computing system 200 may include more or less than the modules illustrated in FIG. 2 and some of the modules may be combined as circumstances warrant. Although not illustrated, the various modules of the PBE computing system 200 may access and/or utilize a processor and memory, such as processor 102 and memory 104, as needed to perform their various functions.

As illustrated in FIG. 2, the PBE computing system 200 includes a data input module 210. In operation, the data input module 210 receives input data 215 (also simply referred to herein as "data 215") that is to be subjected to one or more programs that are generated by the computing system 200 based on user input examples as will be explained in more detail to follow. The data 215 may be any type of data that is able to be subjected to the generated programs. In one embodiment, the data 215 may be semi-structured data such as semi-structured textual data or log files. In other embodiments, the data 215 need not be textual. The data 215 may also include spreadsheets or webpages. The data 215 may be received from any reasonable source as circumstances warrant.

The PBE computing system 200 also includes a user input example module 220. In operation, the user input example module 220 receives various user input examples 221, 222, and potentially any number of additional user input examples as illustrated by the ellipses 223 from a user 205. The user input examples 221, 222, and 223 are examples that specify or identify an intended or determined result that the user 205 would like a generated program to achieve when implemented.

For example, in one embodiment the user input examples 221, 222, or 223 may specify that the user 205 would like the generated program to extract the set of individual authors from the Bibliography section of a paper. In another embodiment, the input examples 221, 222, or 223 may specify that the user 205 would like the generated program to extract a country name from a listing of cites and countries. In some embodiments, the user input examples 221, 222, or 223 may be input by having the user 205 highlight or otherwise identify in a user interface the desired information to be extracted from the semi-structured data, such as the list of authors or the country name to extract. In other embodiments, the user input examples 221, 222, or 223 may be input in other reasonable ways. Accordingly, the embodiments disclosed herein are not limited by the type of the user input examples 221, 222, or 223 or how the input examples are input into the user example input module 220. It will be appreciated that although the user 205 will typically be a human user, the user 205 may also include non-human computing systems, artificial intelligence and the like.

The PBE computing system 200 further includes a logical pattern module 230. As illustrated, the logical pattern module 230 receives one or more of the user input examples 221, 222, and 223 and also receives the data 215. Upon receipt of the data 215, a logical pattern analyzer 234 may determine all the logical patterns that are present in each entry of the data 215. For example, suppose that the data 215 is a spread sheet having n input rows or entries $i_1, i_2 \ldots$ to $i_n$. The logical pattern analyzer 234 may analyze and determine all the logical patterns found in the input $i_1$, all the logical patterns found in the input $i_2$, and so on to input $i_n$. In this way, all the possible logical patterns for each input entry may be identified. The logical patterns may include common patterns found in each entry of the data 215 such as common spacing between data strings, common locations of data strings, having a common white space in the data string, having a common data sting at the beginning or ending of the data string, or any other type of pattern that may be present in the input data. Accordingly, the embodiments disclosed herein are not limited by any particular type of logical patterns.

In some embodiments, the identified logical patterns represent a set of substring expression tokens that are commonly found in the Domain-specific-language (DSL) that is being utilized by the PBE computing system 200. These commonly used DSL substring expression tokens may be preprogrammed into the system so that the logical pattern analyzer 234 may quickly identify the substring expression tokens without the need for a large amount of computing resources. For example, is some embodiments, the logical pattern analyzer 234 may have access to a table of the common substring expression tokens that can be utilized in quickly identifying the logical patterns.

In other embodiments, however, the logical pattern analyzer 234 is not limited to the set of common substring expression tokens. In such embodiments, the logical pattern analyzer 234 is able to determine substring expressions based on the logical patterns themselves. For example, if multiple inputs included string data that was not included in the set of preprogrammed common substring expression tokens but that had a common logical pattern across all of the inputs, the logical pattern analyzer 234 would be able to determine or learn the required substring expression based on the logical pattern across all of the inputs. Accordingly, this advantageously allows the logical pattern analyzer 234 to analyze logical patterns regardless of whether they represent common substring expression tokens or not.

Once all possible logical patterns are determined or identified, a logical pattern organizer 235 may organize the identified logical patterns in a way that can be used to generate the desired programs. For example the logical pattern organizer 235 may organize the logical patterns so that only those logical patterns that are commonly found in all the input rows or entries $i_1, i_2$. to $i_n$ are used when generating the programs.

In one embodiment, the logical pattern organizer 235 may include a graph generator 236. In operation, the graph generator 236 may generate a graph for all possible logical patterns for each of the input rows or entries $i_1, i_2 \ldots$ to $i_n$ as a way of organizing the logical patterns. The graph generator 236 may then intersect each of the individual graphs for each of the inputs to thereby generate a new intersected graph that includes the logical patterns that are common to each of the inputs. A specific example of the graph generator 236 will be explained in further detail to follow.

In some embodiment, the logical pattern module 230 may include a mapping module 237. In operation, the mapping module 237 may map the logical patterns that are organized by the logical pattern organizer with data strings of the data 215 and with substring expressions that represent the logical patterns. This mapping may then be used to generate the one or more programs that will result in the user intended result as will be explained in more detail to follow.

The PBE computing system 200 may further include a program generation module 240. The program generation module 240 may receive the organized logical patterns that have been organized by the logical pattern organizer 235 and that have been mapped by the mapping module 237. The program generation module may also receive the user input examples 221, 222, and perhaps 223.

The program generation module 240 may include a rank module 245 that ranks the various logical patterns based on the user input examples to find the logical pattern that is most likely to output the user intended or desired output. In the embodiment utilizing the graph generator 236, the ranking module 245 may find the longest path in the intersected graph to determine which logical patterns are most likely to result in the desired output. This process with be explained in more detail to follow.

The program generation module 240 also includes or has access to a substring expression bank 246. The substring expression bank includes Domain-specific-language (DSL) substring expressions 246a, 246b, and possible any number of additional substrings illustrated by the ellipses 246c that can be used in the generated program to achieve the desired result.

The program generation module 240 uses the logical pattern most likely to output the user intended result that is determined by the ranking module to generate the output program 250. In some embodiments, the program generator uses the mapping provided by the mapping module 237 to select the appropriate substring expressions from the substring expression bank 246 when generating the program. The generated output program 250 may then be applied to the input data 215 to produce the user desired or intended result as indicated by the user input example 221, 222, or 223 being output to the user 205. In some embodiments, the desired or intended result, indicated by 265, may be shown on a User Interface (UI) 260 to the user 205.

For example, if the user would like the generated program to extract the set of individual authors from the Bibliography section of a paper, then the generated program 250 would output the list of authors to the user. In this way, even if the user 250 did not know how to create the program, the PBE computing system 200 is able to generate the required program based on the common logical patterns found in the input data.

Figure 3:
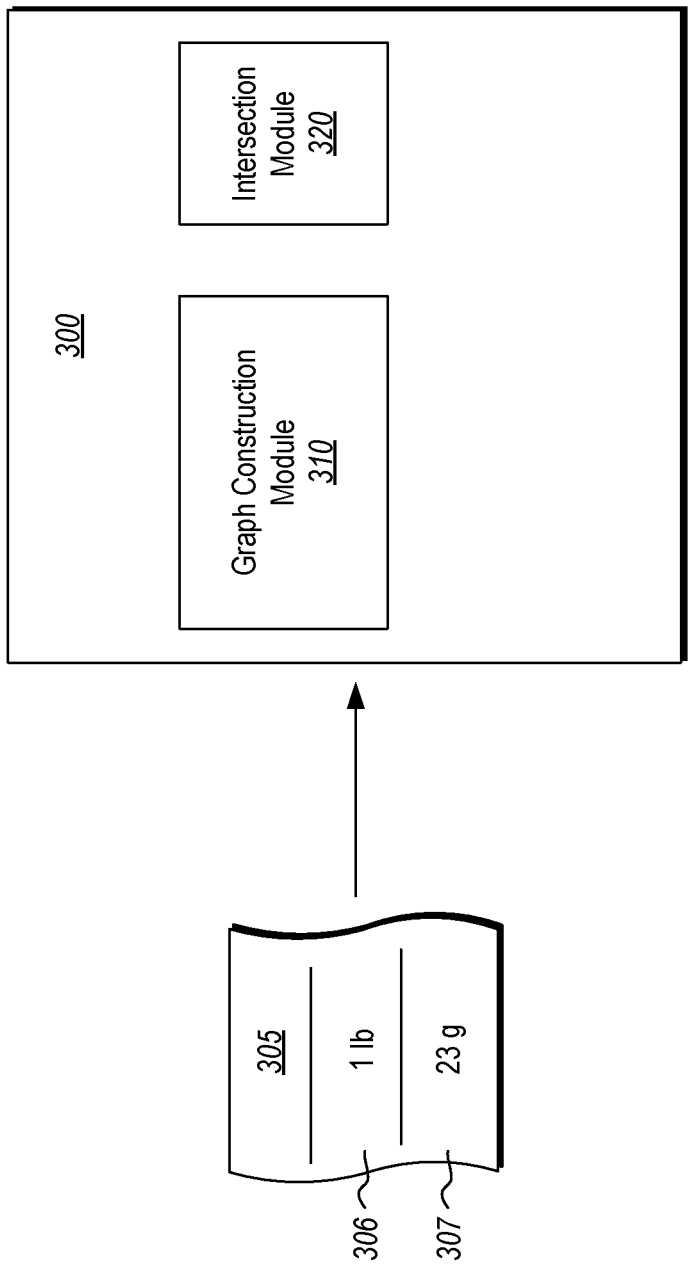
FIG. 3 illustrates a graph generator of the PBE computing system of FIG. 2.

FIG. 3 illustrates a graph generator 300, which may correspond to the graph generator 236 described above. The graph generator 300 includes a graph construction module 310 that in operation constructs a graph for all of the logical patterns for each of the entries of the data 215. An example of the operation of the graph construction module 215 will now be explained.

Referring to FIG. 3, the graph construction module 310 receives or otherwise accesses input data 305, which may correspond to the input data 215. As shown, the input data 305 includes a first entry including the string "1 lb" denoted at 306 and a second entry including the string "23 g" denoted at 307.

Figure 4:
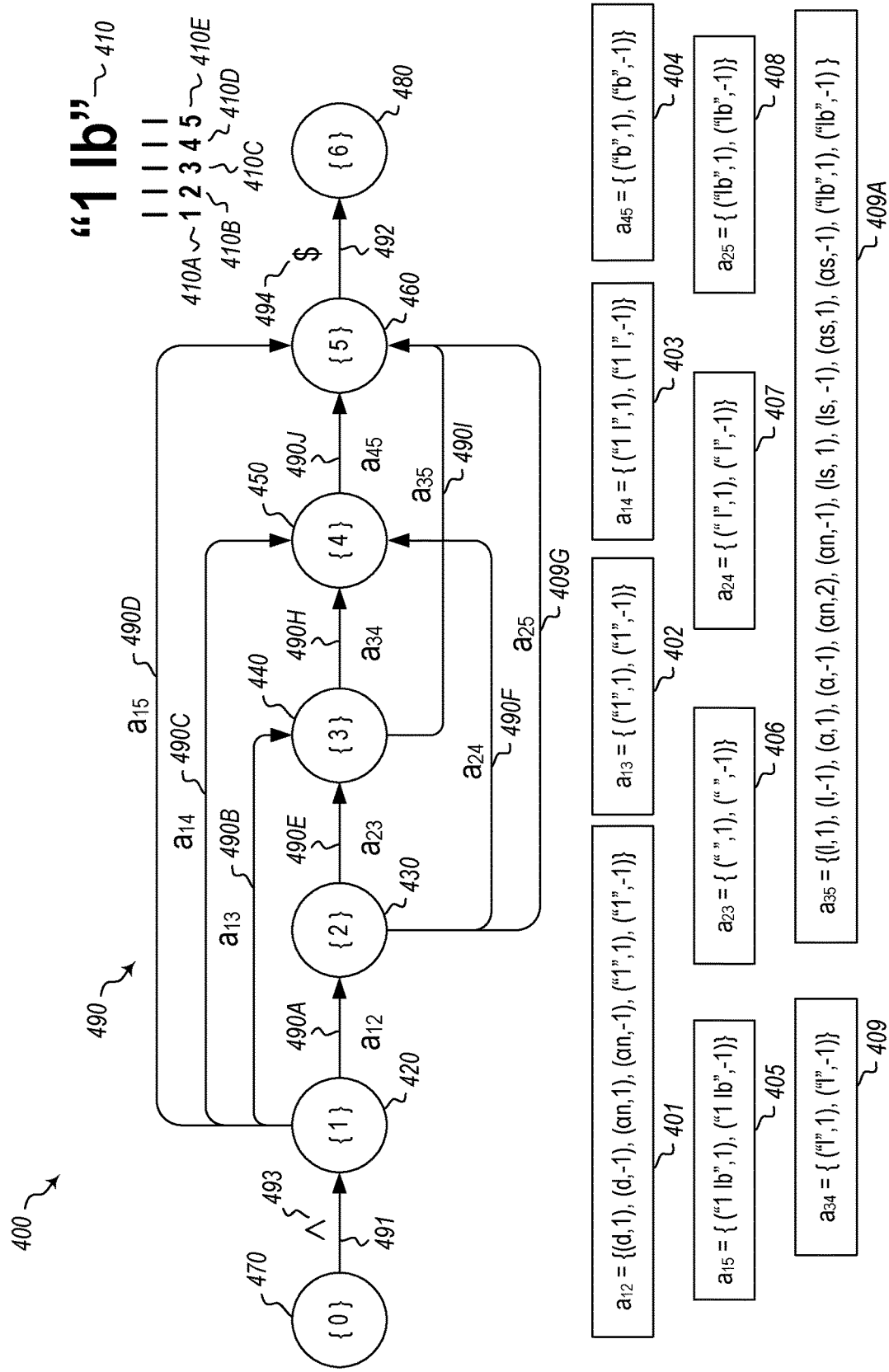
FIG. 4 illustrates an embodiment of a graph generated by the PBE computing system.

The graph construction module 310 may then create a graph for the entry 306 and for the entry 307. Referring to FIG. 4, a graph 400 for the string "1 lb" 306 is illustrated. As shown in FIG. 4, the graph 400 includes various nodes that represent the indices of the string "1 lb". For example, as denoted at 410, the string "1 lb" includes a first index 410A, a second index 410B, a third index 410C, a fourth index 410D, and a fifth index 410E. Accordingly, the node 420 represents the index 410A, the node 430 represents the index 410B, the node 440 represent the index 410C, the node 450 represents the index 410D and the node 460 represents the node 410E. In addition the graph 400 includes a node 470 and a node 480 that represent beginning and ending indices respectively.

The graph 400 also includes edges 490 that connect the nodes 420-460. For example, an edge 490A connects the nodes 420 and 430, an edge 490B connects the nodes 420 and 440, an edge 490C connects the nodes 420 and 450, an edge 490D connects the nodes 420 and 460, an edge 490E connects the nodes 430 and 440, an edge 490F connects the nodes 430 and 450, an edge 490G connects the nodes 430 and 460, an edge 490H connects the nodes 440 and 450, an edge 490I connects the nodes 440 and 460, and an edge 490J connects the nodes 450 and 460. In addition, an edge 491 connects the node 470 and the node 420 and an edge 492 connects the node 460 and the node 480.

The edges of the graph that connect the various nodes represent or are mapped to the substring expressions of the different logical patterns for the string represented by the nodes. Accordingly, the edges 490, 491, and 492 represent substring expressions for the logical patterns of the string "1 lb".

The graph 400 also includes mapping indicators or labels for each of the edges 490, 491, and 492 that map the edge to the substring expression represented by the edge that may be generated by the mapping module 237. For example, the edge 490A includes a mapping indicator $a_{12}$, the edge 490B includes a mapping indicator $a_{13}$, the edge 490C includes a mapping indicator $a_{14}$, the edge 490D includes a mapping indicator $a_{15}$, the edge 490E includes a mapping indicator $a_{23}$, the edge 490F includes a mapping indicator $a_{24}$, the edge 490G includes a mapping indicator $a_{25}$, the edge 490H includes a mapping indicator $a_{34}$, the edge 490I includes a mapping indicator $a_{35}$, the edge 490J includes a mapping indicator $a_{45}$.

The mapping indicators point to the substring expressions of the relevant DSL for each of the edges 490 as also shown in FIG. 4. As described above, the substring expressions may be stored in the substring expression bank 246. For example, the mapping indicator $a_{12}$ maps to substring expressions 401 that represent all the logical patterns between the index 410A and 410B in the string "1 lb". Likewise, the remaining mapping indicators map to the substring expressions 402, 403, 404, 405, 406, 407, 408, 409, and 490A respectively as shown in FIG. 4. As with the substring expressions 401, the substring expressions 402, 403, 404, 405, 406, 407, 408, 409, and 490A represent all the logical patterns between their respective indices as also shown in FIG. 4.

The edges 491 and 492 also include mapping indicators 493 and 494 respectively that map to substring expressions. The substring expressions represented by these edges, however, indicate a start (edge 491) and an end (edge 492) of the string "1 lb".

Figure 5:
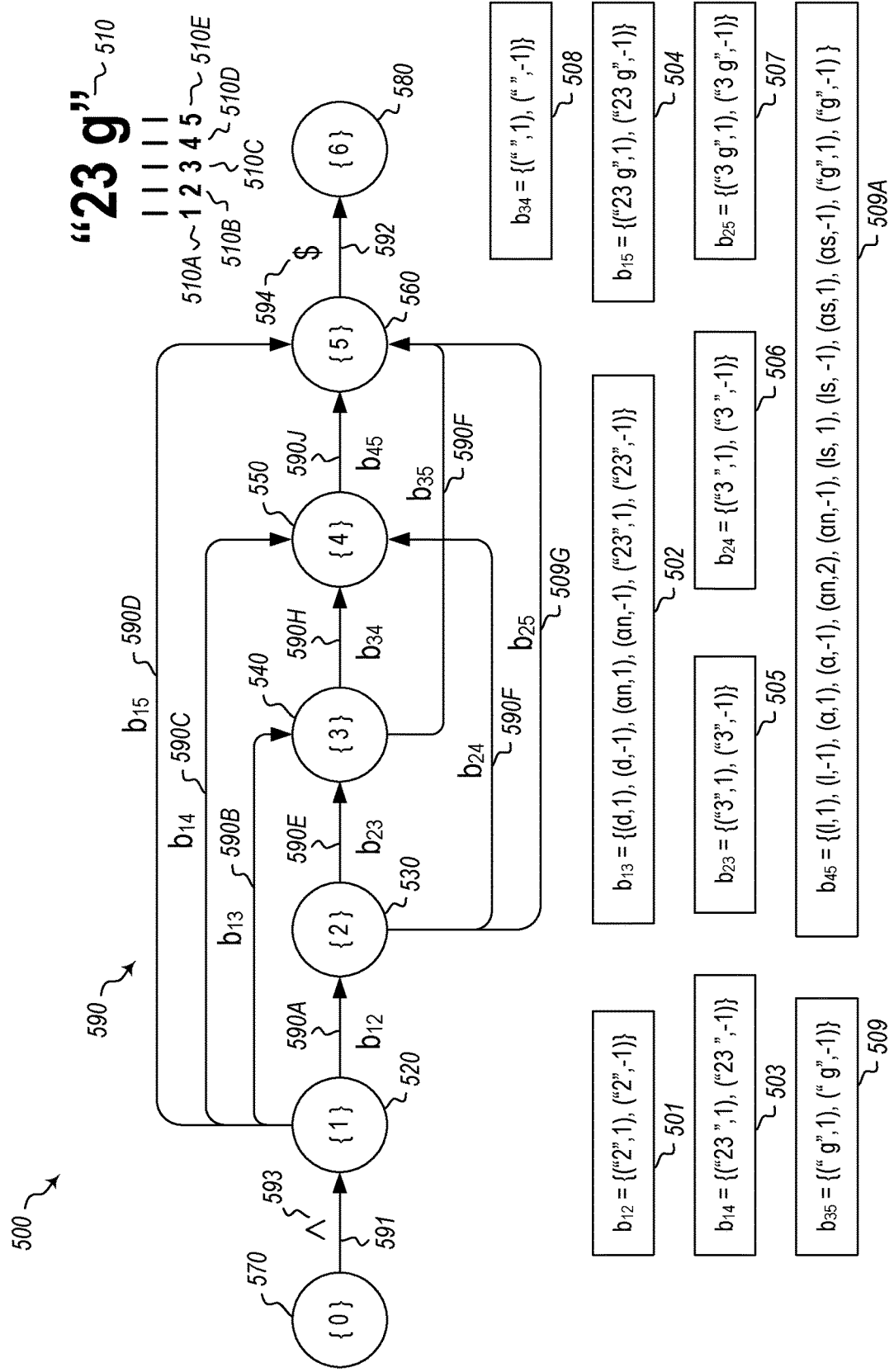
FIG. 5 illustrates another embodiment of a graph generated by the PBE computing system.

The graph construction module 310 may also create a graph for the entry 307. Referring to FIG. 5, a graph 500 for the string "23 g" 307 is illustrated. As shown in FIG. 5, the graph 500 includes various nodes that represent the indices of the string "23 g". For example, as denoted at 510, the string "23 g" includes a first index 510A, a second index 510B, a third index 510C, a fourth index 510D, and a fifth index 510E. Accordingly, the node 520 represents the index 510A, the node 530 represents the index 510B, the node 540 represent the index 510C, the node 550 represents the index 510D and the node 560 represents the node 510E. In addition the graph 500 includes a node 570 and a node 580 that represent beginning and ending indices respectively.

The graph 500 also includes edges 590 that connect the nodes 520-560. For example, an edge 590A connects the nodes 520 and 530, an edge 590B connects the nodes 520 and 540, an edge 590C connects the nodes 520 and 550, an edge 590D connects the nodes 520 and 560, an edge 590E connects the nodes 530 and 540, an edge 590F connects the nodes 530 and 550, an edge 590G connects the nodes 530 and 560, an edge 590H connects the nodes 540 and 550, an edge 590I connects the nodes 540 and 560, and an edge 590J connects the nodes 550 and 560. In addition, an edge 591 connects the node 570 and the node 520 and an edge 592 connects the node 560 and the node 580.

The edges of the graph that connect the various nodes represent or are mapped to the substring expressions of the different logical patterns for the string represented by the nodes. Accordingly, the edges 590, 591, and 592 represent substring expressions for the logical patterns of the string "23 g".

The graph 500 also includes mapping indicators or labels for each of the edges 590, 591, and 592 that map the edge to the substring expression represented by the edge that may be generated by the mapping module 237. For example, the edge 590A includes a mapping indicator $b_{12}$, the edge 590B includes a mapping indicator $b_{13}$, the edge 590C includes a mapping indicator $b_{14}$, the edge 590D includes a mapping indicator $b_{15}$, the edge 590E includes a mapping indicator $b_{23}$, the edge 590F includes a mapping indicator $b_{24}$, the edge 590G includes a mapping indicator $b_{25}$, the edge 590H includes a mapping indicator $b_{34}$, the edge 590I includes a mapping indicator $b_{35}$, the edge 590J includes a mapping indicator $b_{45}$.

The mapping indicators point to the substring expressions of the relevant DSL for each of the edges 590 as also shown in FIG. 5. As described above, the substring expressions may be stored in the substring expression bank 246. For example, the mapping indicator $a_{12}$ maps to substring expressions 501 that represent all the logical patterns between the index 510A and 510B in the string "23 g". Likewise, the remaining mapping indicators map to the substring expressions 502, 503, 504, 505, 506, 507, 508, 509, and 590A respectively as shown in FIG. 5. As with the substring expressions 501, the substring expressions 502, 503, 504, 505, 506, 507, 508, 509, and 590A represent all the logical patterns between their respective indices as also shown in FIG. 5.

The edges 591 and 592 also include mapping indicators 593 and 594 respectively that map to substring expressions. The substring expressions represented by these edges, however, indicate a start (edge 591) and an end (edge 592) of the string "23 g".

Returning to FIG. 3, it is shown that the graph module 300 may also include an intersection module 320. In operation, the intersection module 320 intersects the graphs for each input entry generated by the graph construction module 310 and produces an intersected graph that includes all the logical patterns that are consistent with each of the inputs. In other words, the intersected graph includes those logical patterns that are commonly found in each input entry and removes any logical patterns that are only found in some, but not all, of the input entries.

Figure 6:
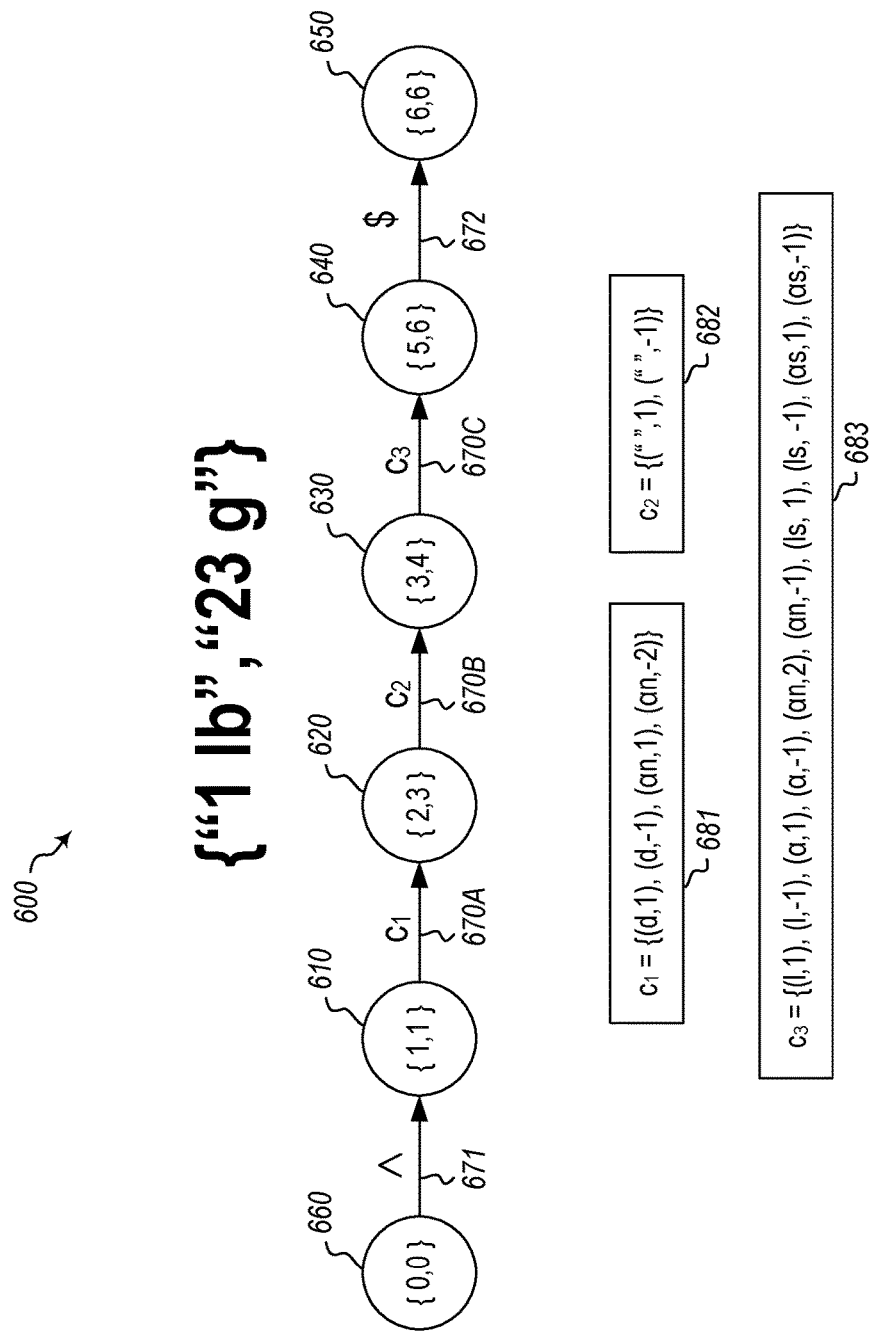
FIG. 6 illustrates an embodiment of an intersected graph of the graphs of FIGS. 4 and 5.

FIG. 6 illustrates an intersected graph 600 that is the result of the intersection module 320 intersecting the graph 400 for the string "1 lb" 306 and the graph 500 for the string "23 g" 307. As shown in FIG. 6, the intersected graph 600 includes nodes 610-660. In the intersected graph, however, the nodes represent a set of indices that map back to one or more indices of the graphs that were intersected.

For example, the node 610 represents the first index 420 and first index 510 of the graphs 400 and 500, the node 620 represents the second index 430 and the third index 540 of the graphs 400 and 500, the node 630 represents the third node 440 and the fourth node 550 of the graphs 400 and 500, and the node 640 represents the fifth index 460 and the fifth index 440 of the graphs 400 and 500. In similar manner, the node 660 represents the start node 470 and start node 570 of the graphs 400 and 500 and the node 650 represents the end node 470 and the end node 570 of the graphs 500 and 600.

The graph 600 includes edges that connect the nodes. In this case, the edges represent substring expressions of the logical patterns that are common to each of the input entries. In graph 600, an edge 670A connects nodes 610 and 620, an edge 670B connects nodes 620 and 630, and an edge 670C connects nodes 630 and 640. In addition, an edge 671 connects the node 660 and the node 610 and an edge 672 connects the node 640 and the node 650.

The edge 670A includes a mapping indicator $c_1$ that points to the substring expressions 681. The substring expressions 681 represent the common logical patterns for the indices of the node 610. Likewise, the edge 670B includes a mapping indicator $c_2$ that points to the substring expressions 682. The substring expressions 682 represent the common logical patterns for the indices of the node 620. Similarly, the edge 670B includes a mapping indicator $c_3$ that points to the substring expressions 683. The substring expressions 683 represent the common logical patterns for the indices of the node 630. The edges 660 and 650 have mapping indicators that map to the start and end substring expressions.

Once the intersected graph 600 has been generated, the substring expressions of the relevant DSL representing the common logical patterns can be used to generate the program the will output the user indicated or desired result. For example, the program generation module may determine which of the substring expressions represented by various edges of the intersected graph 600 will output the user intended result indicated by one or more of the user input examples 221, 222, or 223. In one embodiment to be explained in more detail to follow, the ranking module 245 may find the longest path between nodes in the intersected graph 600 that includes substring expressions that can generate the user desired output. In other words, the longest path represents the set of substring expressions that are most likely to generate a program that will output the user intended result.

A specific example for the PBE computing system 200 to generate a program that will output a user intended result based on the input logical patterns will now be explained. A spreadsheet 710 shown in FIG. 7A includes six input entries 711-716 that list a city and the country where the city is located in a column. For example, input entry 711 lists Mumbai, India, input entry 712 lists Los Angeles, United States of America, input entry 713 lists Newark, United States, input entry 714 lists New York, United States of America, input entry 715 lists Wellington, New Zealand, and input entry 716 lists New Delhi, India.

Suppose that the user 205 provided a user input example 221 that indicated that the user desired to extract each country from the list of city and country. This is indicated in FIG. 7 at 717 where India is listed by itself. The user 205 could provide the user input example to the input example module 220 by highlighting India (or another of the country names) in a UI such as UI 260, by entering India (or another of the country names) into the output row, or could provide the user input example by some other reasonable means.

Given the user input example "Mumbai, India"→"India", there are a large number of possible regular expression-based logics to extract the substring "India". For example, to identify the left index of the substring, some possible logics are: i) start of 2nd Alphabet token, ii) start of 2nd Alphanumeric, iii) end of 1st Whitespace, iv) end of 1st comma followed by whitespace, etc. There may be more than $10^3$ different logics in a typical DSL that can identify this position. Similarly, for the right index of the substring, there may also be more than $10^3$ different logics. Accordingly, there is a need to use the input logical patterns as explained to reduce the number of possible logics so that the desired program may be arrived at in an efficient manner.

Figure 7B:
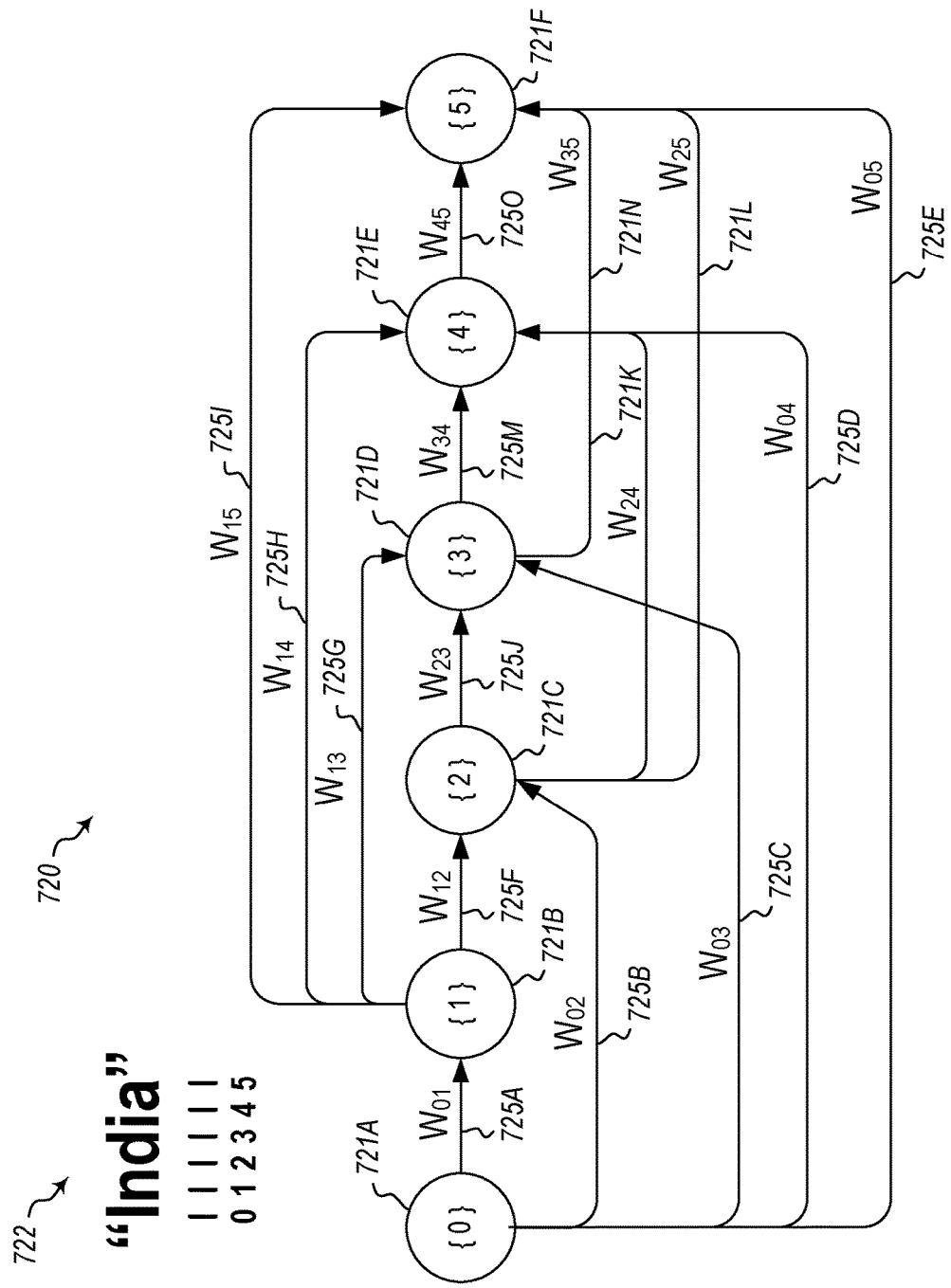

The logical pattern module 230 and its various modules previously described such as graph construction module 310 may then generate a graph 720 for the input entry "India" as illustrated in FIG. 7B. The graph 720 includes nodes 721A, 721B, 721C, 721D, 721E, and 721F that represent the indices of "India" as illustrated at 722. The graph 720 also includes edges 725A-725O that connect the various nodes and that represent the substring expressions of the logical patterns for each of the indices as previously explained. The edges of the graph 720 also include mapping functions $W_{01}$-$W_{45}$ as shown in the figure. In FIG. 7B, the edge mapping functions $W_{01}$-$W_{45}$ now correspond to substring expressions consisting of left and right position expressions, where each position expression is denoted by a set of nodes from the intersection graph as will be explained in further detail to follow.

Although not illustrated, the logical pattern module 230 may generate a graph for each of the other input entries similar to "Mumbai, India". For example, a graph may be generated for "Los Angeles, United States of America" 712, "Newark, United States" 713, "New York, United States of America" 714, "Wellington, New Zealand" 715, and "New Delhi, India" 716.

Figure 7C:
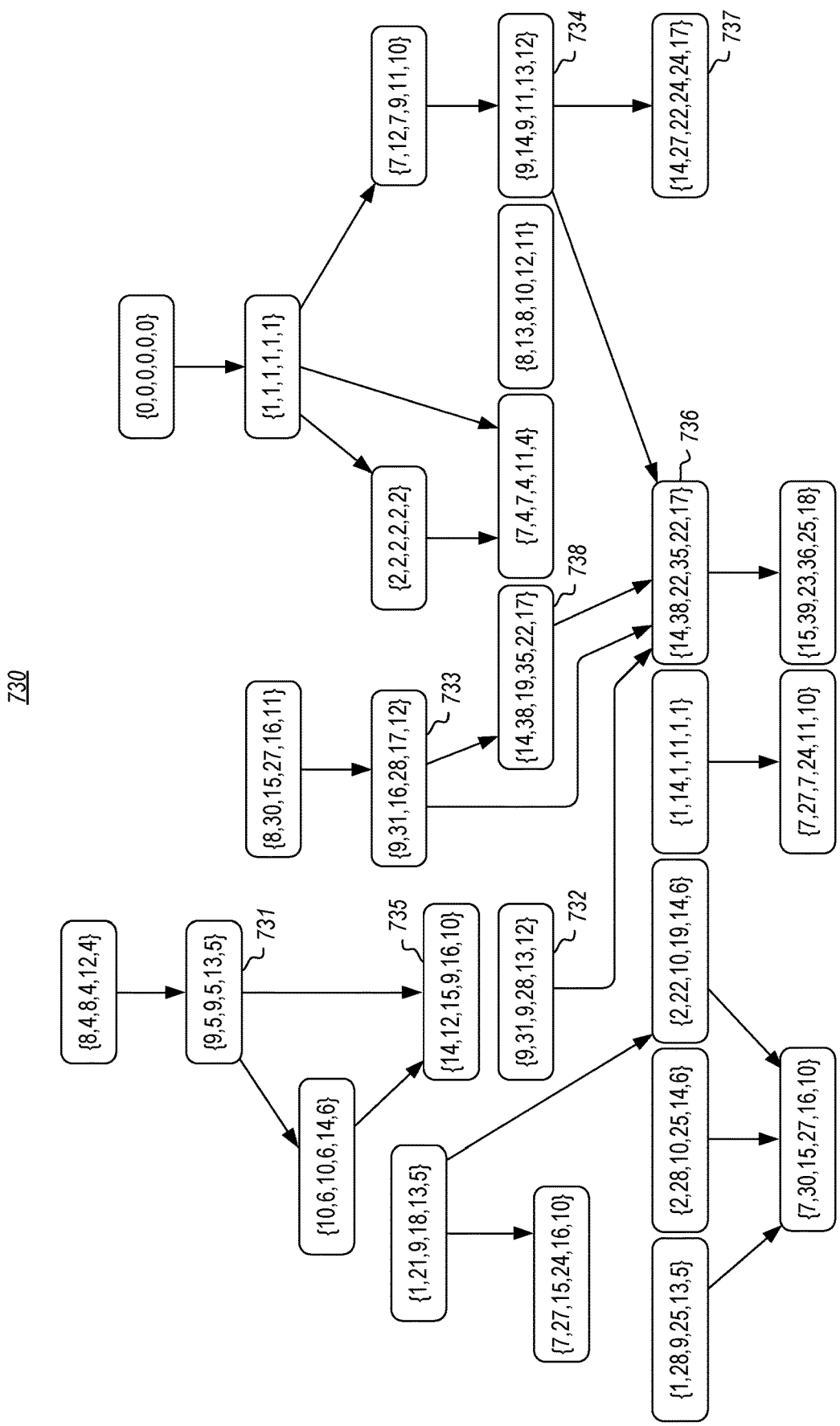

The logical pattern module 230 and its various modules previously described such as intersection module 320 may then generate an intersected graph 730 of the graph 720 and the non-illustrated graphs for the other inputs 712-716. FIG. 7C illustrates the intersected graph 730. A previously described, the intersection of the graphs may be based on the logical patterns that are common across all the input entries.

As shown in FIG. 7C, the intersected graph 730 includes nodes and edges. It will be appreciated that for brevity, not all of the edges are illustrated in FIG. 7C. In addition, for ease of explanation, only some of the nodes and edges will be explained and the mapping indicators are not included.

The graph 730 includes nodes 731-738. Each of the nodes 731-738 represents index locations of the desired string to be extracted in the input data 710. For example, the node 734 represents the string indices {9, 14, 9, 11, 13, 12} from the input data entries 711-716. The 9 represents the $9^{th}$ index in the string "Mumbai, India" 711, which is the location of the "I" in India. The 14 represents the 14th index in the string "Los Angeles, United States of America" 712, which is the location of the "U" in United. In like manner, the remaining indices 9, 11, 13, 12 represent the location of the strings "U", "U", "N", and "I" in string entries 713-716 respectively. It will be appreciated that each of the strings represented by the node 734 is the first letter of the name of the country to be extracted from the data. This is an example of a logical pattern in the input data 710 that is common across all input entries.

As another example of a node, the node 736 represents the string indices {14, 38, 22, 35, 22, 17} from the input data entries 711-716. The 14 represents the 14th index in the string "Mumbai, India" 711, which is the location of the "a" in India. The 38 represents the 38th index in the string "Los Angeles, United States of America" 712, which is the location of the "a" in America. In like manner, the remaining indices 22, 35, 22, 17 represent the location of the strings "s", "a", "d", and "a" in string entries 713-716 respectively. It will be appreciated that each of the strings represented by the node 736 is the last letter of the name of the country to be extracted from the data. This is another example of a logical pattern in the input data 710 that is common across all input entries.

As described above, the program generation module 240 and its various modules previously described such as rank module 245 may then rank the graph 730 to determine a longest path from a start node to a finish node that will generate the user desired output. In the present example where the user input example is "Mumbai, India"→"India", the rank module 245 may determine the longest path that will extract India from Mumbai. In other words, the substring expressions represented by the edges of the longest path, when combined, would consist of a program that is likely to extract "India" from "Mumbai, India" and to extract the other countries of the input data. If the user 205 provided a second user input example 222, for example, "Los Angeles, United States of America"→"United States of America", then the rank module 245 would look for the longest path that would extract both India and United States of America.

As previously discussed in relation to FIG. 7B, in some embodiments, the substring expressions may include the position expression $p_l$, which represents the index or location of the left most string and the position expression $p_r$, which represents the index or location of the right most string. In other words, the position expressions $p_l$ and $p_r$ denote the set of possible expressions for the left index and right index respectively. Each of the position expressions corresponds to a set of nodes in the intersected graph 730. For example, in the data entry 711 $p_l$ and $p_r$ for "India" are 9 and 14 respectively and correspond to those nodes of the intersected graph 730, such as nodes 731-738, that show the 9 and the 14. In such embodiments, the rank module 245 determines a longest path length for the index $p_l$ and for the index $p_r$ when generating the program 250.

Figures 7D, 8:
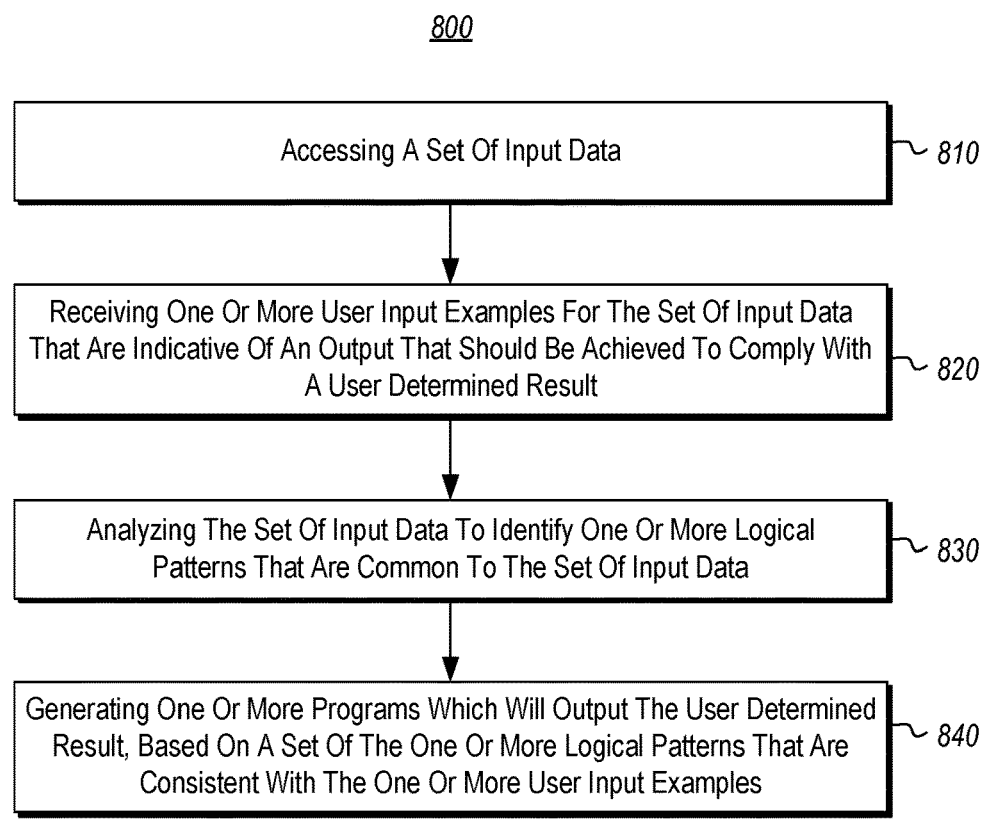

An example of this ranking is found in FIG. 7D. As shown in FIG. 7D, the ranking module 245 determines the path length of a given node by determining an input score 740 and output score 750 for each node in the graph 730. The nodes shown in FIG. 7D correspond to the nodes 731-738 discussed above.

As illustrated, the input score 740 corresponds to the number of nodes from which there exists a path to a given node 731-738, whereas the output score 750 captures the number of nodes that are reachable from the given node 731-738. The ranking module 245 also uses the node distance function $\varphi\eta$ to assign higher scores to nodes that are farther (in terms of string indices) to prefer longer string matches. Finally, the ranking module 245 computes a total score 760 for the given node 731-738 by adding its input score 740 and its output score 750, and determines the node with the highest score.

As shown in FIG. 7D, for the left index position expressions the ranking module 245 assigns the highest score to node 734 that corresponds to the set of substring expressions (",", 1, End) (end of first comma followed by a whitespace), (ps, 2, Start) (start of second proper case token with spaces), etc. On the other hand, the ranking module 245 assigns a low score to node 732 that corresponds to the set of substring expressions (C, 2, Start) (start of second capital letter token), because while these substring expressions may extract "India", they are incorrect for extracting countries from input strings such as "Los Angeles, United States of America".

Similarly, for the set of right index position expressions, the ranking module 245 assigns high scores to nodes 736 corresponding to the substring expressions (^, 1, End) and 737 corresponding to the substring expressions (ps, 2, End) as these subexpressions are likely to extract the country names. The ranking module 245 assigns a low score to the node 738 that corresponds to the substring expressions ("a", −1, End) (last match of the constant string token "a") as these substring expressions are not likely to correctly extract the country names.

Once the longest path from the start node to the finish node is determined as described above, the logical pattern generation module 240 may use the substring expressions represented by the edges of the path to generate the program 250. In this manner, the program 250 may be generated by primarily using the logical patterns of the input data without the need to rank output programs to find the program most likely to generate the user intended result.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 8 illustrates a flow chart of an example method 800 for generating, by an underlying PBE computing system, a program based on common logical patterns of input data, the program outputting a user intended result based on a user input example. The method 800 will be described with respect to one or more of FIGS. 2-7 described above.

The method 800 includes accessing a set of input data (act 810). For example, as previously described, the data input module receives a set of input data 215 from a user 205. The input data 215 may be structured data such as spreadsheet 710 or it may be unstructured data.

The method 800 includes receiving one or more user input examples for the set of input data that are indicative of an output that should be achieved to comply with a user determined result (act 820). For example, the input example module 220 may receive one or more user input examples 221, 222, and 223. The user input examples 221, 222, and 223 indicate or specify an user intended result that should be achieved by the program 250 generated by the PBE computing system 200 as previously described.

The method 800 includes analyzing the set of input data to identify one or more logical patterns that are common to the set of input data (act 830). For example, the logical pattern module 230 may analyze the input data 215 to determine or identify the logical patterns in each of the entries of the input data 215 as previously described. In one embodiment, analyzing the data include organizing the input data into a graph for each entry having nodes that represent indices of the input data strings and the edges representing substring expressions for the logical patterns found in the input data strings as previously described. The graphs may then be intersected to generate an intersected graph as previously described.

The method 800 also includes generating one or more programs which will output the user determined result, based on a set of the one or more logical patterns that are consistent with the one or more user input examples (act 840). For example, as previously described the program generation module generates the program 250 that will output the user determined result based on the logical patterns that are consist with the user input examples 221, 222, and 223. In one embodiment the ranking module 245 may determine a longest path length of an intersected graph based on or consist with the user input example. That is, the ranking module 245 determines the substring expressions represented by the edges of the intersected graph based on the longest path length that will result in the outcome specified by the user input example.

FIG. 9 illustrates a flow chart illustrates a flow chart of an example method 900 for generating, by an underlying PBE computing system, a program based on common logical patterns of input data, the program outputting a user intended result based on a user input example. The method 900 will be described with respect to one or more of FIGS. 2-7 described above.

The method 900 includes receiving at a processor of the PBE computing system user input data, the user input data including at least a first input data string and a second input data string (act 910). For example, as previously described the pattern analyzer module 230 may receive the input data 215. The input data 215 may include a first input data string such as input data strings 306 or 711 and a second input data string such as input data strings 307 or 712. In some embodiments, the input data 215 may include additional input data strings such as input data strings 713-716.

The method 900 includes receiving one or more user input examples for the user input data that are indicative of an output that should be achieved to comply with a user determined result (act 920). For example, the input example module 220 may receive one or more user input examples 221, 222, and 223. The user input examples 221, 222, and 223 indicate or specify an user intended result that should be achieved by the program 250 generated by the PBE computing system 200 as previously described.

The method 900 includes determining a first set of logical patterns for the first input data string (act 930) and determining a second set of logical patterns for the second input data string (act 940). For example, the pattern analyzer 234 may analyze the input data to determine the first and second sets of logical patterns as previously described. The first and second sets of logical patterns may include common patterns found in both the first and second input strings such as common spacing between data strings, common locations of data strings, having a common white space in the data string, or having a common data sting at the beginning or ending of the data string.

The method 900 includes organizing the first set of logical patterns for the first input data string into a first graph having first nodes and first edges that connect the first nodes of the first graph (act 950) and organizing the second set of logical patterns for the second input data string into a second graph having second nodes and second edges that connect the second nodes of the second graph (act 960). For example the pattern organizer 235, specifically the graph generator 236, may organize the sets of logical patterns into a graphs having nodes and edges such as the graphs shown in FIGS. 4, 5, and 7B. In some embodiments, graphs may be made for each entry of the input data 215.

The method 900 includes intersecting the first graph and the second graph to generate an intersected third graph having third nodes and third edges that connect the third nodes of the third graph (act 970). For example, the intersection module 320 may intersect the graphs generated in acts 950 and 960 into an intersected graph as shown in FIGS. 6 and 7C.

The method 900 includes ranking the third nodes and third edges based on the one or more user input examples (act 980). For example, as previously explained the ranking module 245 may rank the intersected graph by finding a longest path from a start node to a final node whose substring expressions that are represented or mapped by the edges will produce the result specified by the user input examples 221, 222, and 223.

The method 900 finally includes, based on the ranking, generating one or more programs which will output the user determined result (act 990). For example the program generation module 240 may generate the program 250 that will output the user intended or determined result in the manner previously described.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Example Clauses

Example A, a computing system comprising: at least one processor; and at least one storage device having stored computer-executable instructions which, when executed by the at least one processor, cause the computing system to perform the following: access a set of input data; receive one or more user input examples for the set of input data that are indicative of an output that should be achieved to comply with a user determined result; analyze the set of input data to identify one or more logical patterns that are common to the set of input data; and generate one or more programs which will output the user determined result, based on a set of the one or more logical patterns that are consistent with the one or more user input examples.

Example B, the system as example A recites, wherein analyzing the data to identify the one or more logical patterns comprises organizing each entry of the set of input data into a data graph that has one or more nodes and edges that connect the one or more nodes.

Example C, the system as example B recites, wherein the one or more nodes represent an index of a data string of the set of input data.

Example D, the system as example B recites, wherein the edges represent substring expressions that can be used to generate the one or more programs that will result in the user determined result.

Example E, the system as example B recites, wherein generating the one or more programs based on the one or more logical patterns comprises determining a longest path of the graph that includes the largest number of nodes and edges connecting the nodes.

Example F, the system as example A recites, wherein generating the one or more programs based on the set of the one or more logical patterns comprises ranking the one or more logical patterns to determine substring expressions corresponding to a highest ranked one or more logical patterns, the substring expressions being substring expressions of the one or more programs that will result in the user determined result.

Example G, the system as example A recites, wherein the input data is semi-structured text data.

Example H, the system as example A recites, wherein the set of one or more logical patterns represent substring expressions that can be used to generate the one or more programs that will result in the user determined result.

Example I, a computer implemented method for generating, by an underlying Program-by-Example (PBE) computing system, a program based on common logical patterns of input data, the program outputting a user intended result based on a user input example, the method comprising: an act of receiving at a processor of the PBE computing system user input data, the user input data including at least a first input data string and a second input data string; an act of receiving one or more user input examples for the user input data that are indicative of an output that should be achieved to comply with a user determined result; an act of determining a first set of logical patterns for the first input data string; an act of determining a second set of logical patterns for the second input data string; an act of organizing the first set of logical patterns for the first input data string into a first graph having first nodes and first edges that connect the first nodes of the first graph; an act of organizing the second set of logical patterns for the second input data string into a second graph having second nodes and second edges that connect the second nodes of the second graph; an act of intersecting the first graph and the second graph to generate an intersected third graph having third nodes and third edges that connect the third nodes of the third graph; an act of ranking the third nodes and third edges based on the one or more user input examples; and based on the ranking, an act of generating one or more programs which will output the user determined result.

Example J, the method as example I, wherein the first and second nodes represent an index of the first input data string and the second input data string respectively.

Example K, the method as example I, wherein the first and second edges represent substring expressions that can be used to generate the one or more programs that will result in the user determined result.

Example L, the method as example I, wherein the act of ranking the third nodes and third edges based on the one or more user input examples comprises: an act of determining a longest path of the intersected third graph that includes the largest number of third nodes and third edges connecting the nodes.

Example M, the method as example I, wherein the act of determining the first set of logical patterns for the first input data string or the act of determining the second set of logical patterns comprises: an act of accessing a set preprogrammed substring expressions that represent the first or second set of logical patterns; and an act of using the set of the preprogrammed substring expressions to identify the first or second set of logical patterns.

Example N, the method as example I, wherein the act of determining the first set of logical patterns for the first input data string or the act of determining the second set of logical patterns comprises: an act of identifying the first or second set of logical patterns based on one or more common patterns found in the first or second input data strings.

Example O, the method as example I, wherein the user input data includes a third data input string, the method further comprising: an act of determining a third set of logical patterns for the third input data string; an act of organizing the third set of logical patterns for the third input data string into a fourth graph having fourth nodes and fourth edges that connect the fourth nodes of the fourth graph; and an act of intersecting the fourth graph with the first graph and the second graph to generate the intersected third graph.

Example P, the method as example O, wherein the fourth nodes represent an index of the third input data string and the fourth edges represent substring expressions that can be used to generate the one or more programs that will result in the user determined result.

Example Q, a computer program product comprising one or more computer-readable media having thereon computer-executable instructions that are structured such that, when executed by one or more processors of a computing system, configure the computing system to perform method for generating a program based on common logical patterns of input data, the program outputting a user intended result based on a user input example, the method comprising: accessing a set of input data; receiving one or more user input examples for the set of input data that are indicative of an output that should be achieved to comply with a user determined result; analyzing the set of input data to identify one or more logical patterns that are common to the set of input data; and generating one or more programs which will output the user determined result, based on a set of the one or more logical patterns that are consistent with the one or more user input examples.

Example R, the computer program product as example Q, wherein analyzing the data to identify the one or more logical patterns comprises organizing each entry of the set of input data into a data graph that has one or more nodes and edges that connect the one or more nodes.

Example S, the computer program product as example R, wherein the one or more nodes represent an index of a data string of the set of input data and the edges represent substring expressions that can be used to generate the one or more programs that will result in the user determined result.

Example T, the computer program product as example R, wherein generating the one or more programs based on the one or more logical patterns comprises determining a longest path of the graph that includes the largest number of nodes and edges connecting the nodes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
   at least one processor; and
   at least one storage device having stored computer-executable instructions which, when executed by the at least one processor, cause the computing system to perform the following:

access a set of input data;
receive one or more examples that are indicative of an output that should be achieved when processing the set of input data to comply with a user determined result;
analyze the set of input data to identify one or more logical patterns that are common to the set of input data, including generating a data graph comprising a plurality of nodes and a plurality of edges connecting the plurality of nodes, each of the plurality of edges representing a different substring expression;
determine a length that corresponds to a path between the plurality of nodes and the plurality of edges connecting to the plurality of nodes for each of the different substring expressions;
assign a ranking to each of the different substring expressions according to the determined length, wherein longer lengths correspond to higher rankings; and
generate, based at least on the assigned rankings of the different substring expressions, one or more programs that will output the user determined result.

2. The computing system of claim 1, wherein determining the length that corresponds to the path between the plurality of nodes and the plurality of edges for each of the different substring expressions includes organizing each entry of the set of input data into a data graph that has one or more nodes and edges that connect the one or more nodes.

3. The computing system of claim 2, wherein the one or more nodes represent an index of a data string of the set of input data.

4. The computing system of claim 2, wherein generating the one or more programs based on the one or more logical patterns comprises selecting the graph with the highest assigned ranking.

5. The computing system of claim 1, wherein the input data is semi-structured text data.

6. The computing system of claim 1, wherein the set of one or more logical patterns represent substring expressions that can be used to generate the one or more programs that will result in the user determined result.

7. A computer implemented method for generating, by an underlying Program-by-Example (PBE) computing system, a program based on common logical patterns of input data, the program outputting a user intended result based on a user input example, the method comprising:
receiving, at a processor of the PBE computing system user input data, the user input data including at least a first input data string and a second input data string;
receiving one or more examples that are indicative of an output that should be achieved when processing the user input data to comply with a user determined result;
determining a first set of logical patterns for the first input data string;
determining a second set of logical patterns for the second input data string;
organizing the first set of logical patterns for the first input data string into a first graph having first nodes and first edges that connect the first nodes of the first graph;
organizing the second set of logical patterns for the second input data string into a second graph having second nodes and second edges that connect the second nodes of the second graph;
intersecting the first graph and the second graph to generate an intersected third graph having third nodes and third edges that connect the third nodes of the third graph, each of the third edges representing a different substring expression;
ranking the each of the substring expressions by determining a longest path between the third nodes and the third edges that connect the third nodes of the third graph that corresponds to the different substring expression, wherein a longer path corresponds to a greater likelihood that the corresponding substring expression is more likely to output data that complies with the user determined result; and
based on the ranking, generating one or more programs that will output the user determined result.

8. The method of claim 7, wherein the first and second nodes represent an index of the first input data string and the second input data string respectively.

9. The method of claim 7, wherein the first and second edges represent substring expressions that can be used to generate the one or more programs that will result in the user determined result.

10. The method of claim 7, wherein determining the first set of logical patterns for the first input data string or determining the second set of logical patterns comprises:
accessing a set preprogrammed substring expressions that represent the first or second set of logical patterns; and
using the set of the preprogrammed substring expressions to identify the first or second set of logical patterns.

11. The method of claim 7, wherein determining the first set of logical patterns for the first input data string or determining the second set of logical patterns comprises:
identifying the first or second set of logical patterns based on one or more common patterns found in the first or second input data strings.

12. The method of claim 7, wherein the user input data includes a third data input string, the method further comprising:
determining a third set of logical patterns for the third input data string;
organizing the third set of logical patterns for the third input data string into a fourth graph having fourth nodes and fourth edges that connect the fourth nodes of the fourth graph; and
intersecting the fourth graph with the first graph and the second graph to generate the intersected third graph.

13. The method of claim 12, wherein the fourth nodes represent an index of the third input data string and the fourth edges represent substring expressions that can be used to generate the one or more programs that will result in the user determined result.

14. A computer program product comprising one or more hardware storage devices having stored thereon computer-executable instructions that are structured such that, when executed by one or more processors of a computing system, configure the computing system to perform method for generating a program based on common logical patterns of input data, the program outputting a user intended result based on a user input example, the method comprising:
accessing a set of input data;
receiving one or more examples that are indicative of an output that should be achieved when processing the set of input data to comply with a user determined result;
analyzing the set of input data to identify one or more logical patterns that are common to the set of input data, including generating a data graph comprising a plurality of nodes and a plurality of edges connecting the plurality of nodes, each of the plurality of edges representing a different substring expression;

determining a length that corresponds to the path between the plurality of nodes and the plurality of edges connecting to the plurality of nodes for each of the different substring expressions;

assigning a ranking to each of the different substring expressions according to the determined length, wherein longer lengths correspond to higher rankings; and generating, based at least on the assigned rankings of the different substring expressions, one or more programs that will output the user determined result.

15. The computer program product of claim 14, wherein determining the length that corresponds to the path between the plurality of nodes and the plurality of edges for each of the different substring expressions includes comprises organizing each entry of the set of input data into a data graph that has one or more nodes and edges that connect the one or more nodes.

16. The computer program product of claim 15, wherein the one or more nodes represent an index of a data string of the set of input data and the edges represent substring expressions that can be used to generate the one or more programs that will result in the user determined result.

* * * * *